(12) United States Patent
Lee et al.

(10) Patent No.: US 6,177,007 B1
(45) Date of Patent: Jan. 23, 2001

(54) HIGH EFFICIENCY APPARATUS FOR TREATING NITROGEN AND PHOSPHOROUS CONTAINED IN SEWAGE

(75) Inventors: Eui Shin Lee; Yun Seok Chang; Myung Gyun Park, all of Suwon; Yong Rok Heo, Seoul; Chil Lim Park, Seongnam, all of (KR)

(73) Assignee: Daewoo Corporation, Seoul (KR)

( * ) Notice: Under 35 U.S.C. 154(b), the term of this patent shall be extended for 0 days.

(21) Appl. No.: 09/164,752

(22) Filed: Oct. 1, 1998

Related U.S. Application Data

(63) Continuation-in-part of application No. 08/843,738, filed on Apr. 21, 1997, now abandoned.

(30) Foreign Application Priority Data

Apr. 23, 1996 (KR) .................................................. 96-12310
Apr. 23, 1996 (KR) .................................................. 96-12311

(51) Int. Cl.[7] ........................................................ C02F 3/30
(52) U.S. Cl. ........................ 210/195.1; 210/605; 210/903; 210/906
(58) Field of Search ................................... 210/605, 906, 210/195.1, 903

(56) References Cited

U.S. PATENT DOCUMENTS

| | | | | |
|---|---|---|---|---|
| 4,867,883 | * | 9/1989 | Daigger et al. | 210/605 |
| 5,022,993 | * | 6/1991 | Williamson | 210/605 |
| 5,252,214 | * | 10/1993 | Lorenz et al. | 210/605 |
| 5,651,891 | * | 7/1997 | Molot et al. | 210/605 |

* cited by examiner

Primary Examiner—Thomas G. Wyse
(74) Attorney, Agent, or Firm—Darby & Darby

(57) ABSTRACT

Disclosed herein is a high efficiency apparatus for treating nitrogen and phosphorous in sewage. The apparatus includes a sludge denitrification tank supplying sludge to an anaerobic tank.

1 Claim, 1 Drawing Sheet

HIGH EFFICIENCY APPARATUS FOR TREATING NITROGEN AND PHOSPHOROUS CONTAINED IN SEWAGE

This application is a continuation-in-part of application Ser. No. 08/843,738, filed Apr. 21, 1997, abandoned.

BACKGROUND OF THE INVENTION

1. Field of the Invention

The present invention relates, in general, to a sewage treatment apparatus for purifying wastewater such as sewage and, more particularly, to a high efficiency apparatus for treating nitrogen and phosphorus contained in sewage in case of very low concentration of substrate contained in influent.

2. Description of the Prior Art

In a conventional sewage treatment apparatus, it is impossible to obtain a condition suitable for sewage treatment when sewage in low in concentration or temperature. As a result, loss of sludge occurs in an anaerobic tank equipped in such a conventional sewage treatment apparatus. In addition, the conventional sewage treatment apparatus is typically configured to directly introduce wastewater into the anaerobic tank. However, this configuration accelerates the sludge wash-out in the anaerobic tank, which lowers the removal efficiency of nitrogen and phosphorus.

SUMMARY OF THE INVENTION

Therefore, it is an objective of the present invention to overcome the problems encountered in prior arts and to provide a high efficiency apparatus for treating nitrogen and phosphorus contained in sewage, which can prevent sludge wash-out by steadily providing sludge to a sludge denitrification tank which, then, serves as a sludge reservoir to remove nitrate nitrogen of return sludge by endogeneous denitrification.

Based on the intensive and thorough research by the present inventor, the above objective could be accomplished by a provision of a high efficiency apparatus for treating nitrogen and phosphorus contained in sewage, comprising: a treating tank including a sludge denitrification tank, an anaerobic tanks, a plurality of anoxic tanks and a plurality of aerobic tanks which communicate sequentially with one another; a final settling tank for storing sewage fed from the last aerobic tank; a sewage influent unit arranged between a primary settling tank and the anaerobic tank; an internal recycle unit for denitrifying nitrated materials, the internal recycle unit being arranged between the last aerobic tank and the last one of the anoxic tanks; and a sludge returning unit arranged between the final settling tank and the sludge denitrification tank.

BRIEF DESCRIPTION OF THE DRAWINGS

Other objects and aspects of the invention will become apparent from the following description of embodiments with reference to the accompanying drawing in which.

DETAILED DESCRIPTION OF THE PREFERRED EMBODIMENT

Figure 1:
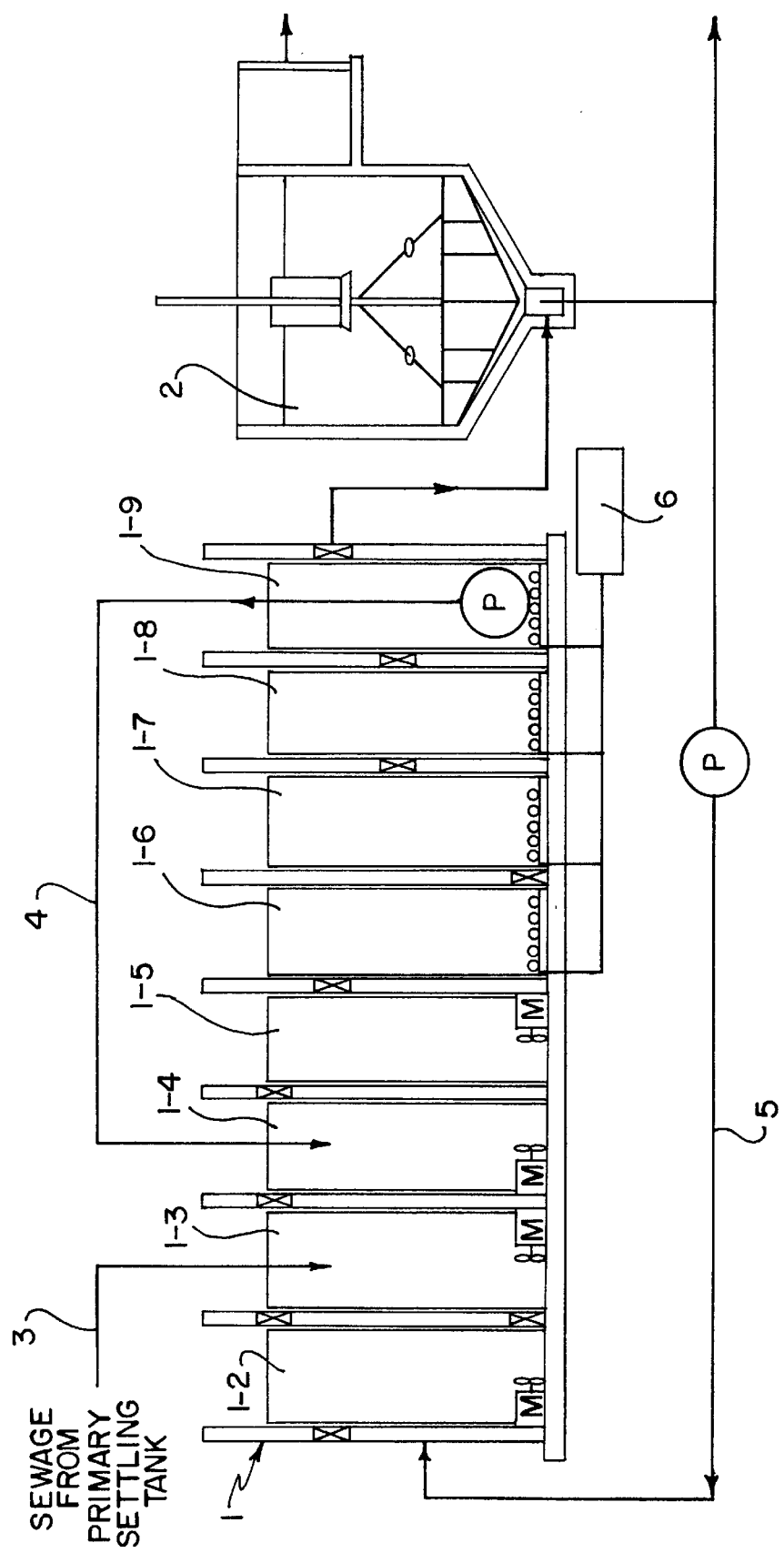
FIG. 1 is a schematic view illustrating a high efficiency apparatus for treating nitrogen and phosphorus contained sewage in accordance with the present invention.

The application of the preferred embodiment of the present invention is best understood with reference to the accompanying drawing.

Referring to FIG. 1, there is a high efficiency apparatus for treating nitrogen and phosphorus contained in sewage in accordance to the present invention As shown in FIG. 1, the apparatus includes a treating tank 1 consisting of a sludge denitrification tank 1-2, an anaerobic tank 1-3, two anoxic tanks 1-4 and 1-5 and four aerobic tanks 1-6, 1-7, 1-8 and 1-9 which are linearly arranged, in order. But according to the requirements degree of nitrogen and phosphorus or situation of sewage treatment plant, it is required to modify the number of anaerobic tanks, anoxic tanks and aerobic tanks.

In addition to the treating tank 1, the apparatus also includes a final settling, tank 2.

In order to feed sewage from a primary settling tank (not shown) to the anaerobic tank 1-3, a sewage influent unit 3 is connected between the primary settling tank and the anaerobic tank 1-3. An internal recycle, unit 4, is arranged between the last aerobic tank 1-9 and the primary anoxic tank 1-4 in order for denitrification of nitrated sewage. A sludge returning unit 5 is also arranged between the final settling tank 2 and the sludge denitrification tank 1-2 for returning sludge. In FIG. 1, the reference numeral "6" represents a blower.

A description will now be given of the procedure of treating sewage, based on the above arrangement according to the present invention.

First, sewage from the primary settling tank (not shown) where substrate and floating materials are partially removed is introduced through the sewage influent, unit 3, to the anaerobic tank 1-3.

Whereas, sludge from the final settling tank 2 is fed to the sludge denitrification tank 1-2 by the sludge returning unit 5. Accordingly, a stable supply of sludge is accomplished which is necessary for effective endogeneous denitrification. As a result, a suitable condition for denitrification is acquired in the sludge denitrification tank 1-2. A reaction for release of phosphorus is also effectively carried out by virtue of substrate contained in the sewage which is introduced through the sewage influent, unit 3, to the anaerobic tank 1-3. In the anoxic tanks 1-4 and 1-5, the sewage is utilized to denitrify a nitrate mixture which is returned from the last aerobic tank 1-9 to the nitrate mixture which is returned from the last aerobic tank 1-9 to the primary anoxic tank 1-4 by internal recycle, unit 4. Thereafter, the denitrified sewage thus obtained in a sequential manner by dissolved oxygen which is supplied by blower 6. At this time, substrate still remaining in the denitrified sewage are also oxidized. The phosphorus components resulting from the release of phosphorus of sewage are absorbed into microorganisms while passing through the aerobic tanks 1-6 to 1-9.

In addition, the sludge deposited on the bottom of the final settling tank 2 returns to the sludge denitrification tank 1-2 by the sludge returning to unit 5. At this time, the treated water is drained out from the final settling tank 2.

As described hereinbefore, the high efficiency apparatus for treating nitrogen and phosphorus according to the present invention is very advantageous in that not only are microorganisms prevented from being lost upon the release of phosphorus in the anaerobic tank, but a stable reaction condition necessary for the release of phosphorus can be acquired in the anaerobic tank 1-3 by returning the sewage from the final settling tank to the sludge denitrification tank 1-2.

In accordance with the present invention, an embodiment of the present apparatus was operated and the result thereof was obtained as follows.

When the concentration of nitrate nitrogen in return sludge was 6.0 mg/l, the sludge was introduced to the sludge denitrification tank and the concentration of nitrate nitrogen was changed through the retention time.

| Retention Time (hrs) | 0 | 0.5 | 1.0 | 1.5 | 2.0 | 3.0 |
|---|---|---|---|---|---|---|
| $NO_3$ Concentration (mg/l) | 6.0 | 5.1 | 3.8 | 2.9 | 2.4 | 2.2 |

On the basis of the above data, the $NO_3$ concentration could be lower to 2.9 mg/l or 2.4 mg/l from 6.0 mg/l at the retention time of 1.5 hrs or 2.0 0.025 $NO_3$ g/gMLVSS days.

When the sludge having a nitrate nitrogen concentration of 3 mg/l below was fed into the anaerobic tank and an influent of BOD 100 mg/l was introduced into the anaerobic tank, the release of phosphorus in the anaerobic tank was maximized.

The present invention has been described in an illustrative manner, and it is to be understood that the terminology used is intended to be in the nature of description rather than of limitation.

Many modification and variations of the present invention are possible in light of the above teachings. Therefore, it is to be understood that within the scope of the appended claims, the invention may be practiced rather than as specifically described.

What is claimed is:

1. A high efficiency apparatus for treating nitrogen and phosphorus contained in sewage, comprising;

a treating tank including an anaerobic tank, a plurality of anoxic tanks and a plurality of aerobic tanks which communicate sequentially with one another;

a final settling tank for storing sewage fed from the last aerobic tank;

a sewage influent unit arranged between a primary settling tank and said anaerobic tank to supply influent to said anaerobic tank;

an internal recycle unit for denitrifying nitrated materials arranged between the last of said plurality of said aerobic tanks and the last of said plurality of anoxic tanks; and a sludge denitrification tank; and a sludge returning unit arranged between said final settling tank and said sludge denitrification tank, said sludge denitrification tank supplying sludge having a nitrate nitrogen concentration of below 3 mg/l into said anaerobic tank.

* * * * *